United States Patent Office 3,709,860
Patented Jan. 9, 1973

3,709,860
MATERIALS BASED ON POLYMERS HAVING RECURRING ACETYLENICALLY UNSATURATED GROUPS AND CURABLE BY IRRADIATION
Erhard Fischer and Gerhard Wegner, Mainz, Germany, assignors to Badische Anilin- & Soda-Fabrik Aktiengesellschaft, Ludwigshafen (Rhine), Germany
No Drawing. Filed Aug. 5, 1970, Ser. No. 61,495
Claims priority, application Germany, Aug. 9, 1969,
P 19 40 692.9
Int. Cl. C08g 22/16
U.S. Cl. 260—77.5 AP                    3 Claims

ABSTRACT OF THE DISCLOSURE

Solvent-soluble polymers which contain recurring molecular units having two conjugated carbon-carbon triple bonds and which can be converted by irradiation into insoluble colored systems. The polymers of the invention are suitable for the production of optical information patterns.

---

The present invention relates to materials which are based on polymers containing recurring molecular units having a diacetylene structure and which can be converted into an insoluble state by the action of light or high-energy radiation and, if desired, heat.

It is known to crosslink natural or synthetic polymers by irradiation with light for example, thus making them substantially insoluble. Over one hundred years ago the crosslinking of gelatins by the action of light especially in the presence of chromate additions was employed for optical information fixing. More recently synthetic resins, such as polyvinyl alcohol, in addition to various natural colloids have been used to an increasing extent for this purpose. A detailed description of these processes is given by J. Kosar, "Light-Sensitive Systems," New York, 1965, who also deals with polymers containing built-in sensitizing additives. Photosensitive polymers containing, as recurring molecular units, two conjugated carbon-carbon tariple bonds and alkylene groups or bisphenol units are also known for example from British Patent 1,149,697, but their adhesion to the substrate leaves much to be desired.

It is an object of the present invention to provide new materials based on soluble polymers which can be easily converted into insoluble colored systems by the action of radiant energy and which are suitable for the production of printing plates, coatings for offset systems and photoresist layers for the production of integrated circuits.

We have found that this object is achieved with soluble materials that are based on polymers and that can be converted into difficultly soluble systems by irradiation, wherein the polymers contain in the main chain of the molecule of a soluble polyurethane, polyester, polyamide or polyurea two conjugated carbon-carbon triple bonds in the recurring molecular unit

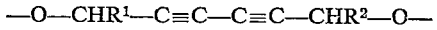

where R¹ and R² are selected from the group consisting of hydrogen and an organic radical having 1 to 14 carbon atoms.

Such polymers have in the polymer molecule recurring polar groups, preferably those which are capable of forming secondary valence bonds. Particularly suitable polymers having recurring

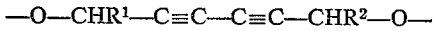

units in the molecule chain are those having in the main chain of the molecule recurring urethane, ester, amide or urea groups containing these units. The polymers may in addition contain polyether groups. It is preferred to use soluble polyurethanes having the said units.

Furthermore, it is preferred to process the polymers for example into films or coatings using polar solvents in order to achieve a good arrangement. Suitable polar solvents are water or aqueous solvents, e.g. mixtures of dioxane and water, dimethyl formamide and water, glacial acetic acid and water, acetone and water, and similar polar solvent systems.

Particularly suitable polar groups are HN—, HO— or HOOC— groups whose hydrogen atoms in the crystal lattice are capable of forming hydrogen bonds between neighboring polar groups. Adherence to the substrate is increased and, at the same time, photoactivity is improved by the polar groups and hydrogen bonds.

In a particularly advantageous method of preparing the polymers the starting materials used have the structure:

$$X-O-CHR^1-C\equiv C-C\equiv C-CHR^2-O-Y \quad (I)$$

where X and Y are identical or different radicals and denote hydrogen and/or an organic radical having at least one "capped" or "uncapped" functional group, such as a hydroxyl group, an amino group, a carboxyl group, a carboxylic halide group or an isocyanate group. Examples of such compounds are hexadiyne-(2,4)-diol-(1,6), octadiyne - (3,5) - diol-(2,7), their bisdicarboxylic acid hemiesters which can be prepared by reacting the diols with dicarboxylic anhydride, e.g. phthalic or maleic anhydride, the low molecular weight reaction products of 1 mole of the diols with at least 2 moles of diisocyanate which then have two terminal diisocyanate groups that can be reacted with diols or diamines or hydrolyzed to terminal amino groups, corresponding reaction products with polyisothiocyanates or disulfonic halides or the reaction products of the diols with ethylene oxide, propylene oxide, ethyleneimine or 1,2-propyleneimine to form derivatives having the formula:

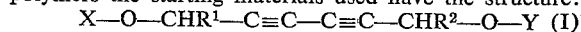

where R⁴ and R⁵=H or R⁴=H and R⁵=CH₃ or R⁴=CH₃ and R⁵=H; Z=O or NH; R¹ and R² have the above meanings; and n and m are integers between 1 and 10, it being possible for dihydroxy compounds (X and Y=H; Z=O) or diamino compounds (X and Y=M; Z=NH) to be formed. An example of such a compound is 3,6,13, 16 - tetraoxaoctadecadiyne-(8,10)-diol-(1,18) having the formula $$[HO-(CH_2CH_2O)_2-CH_2-C\equiv C-]_2$$

and a melting point of 45° C.

Polymers can be prepared in a conventional manner from the compounds having

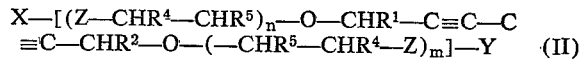

units, e.g. from the diols by reaction with diisocyanates or mixtures of diisocyanates with or without the addition of other diols or polyurethanes, by reacting the diols with dicarboxylic acids, their anhydrides or mixtures of the latter with or wtihout the addition of other diols, polyesters or polyether esters. Diamines having the said units can be reacted with diisocyanates and, if desired, other diamines or diols to form polyureas or polymethane ureas, with dicarboxylic acids, their mixtures or halides to form polyamides or, in the presence of diols, to form polyester amides. The various ways of producing suitable polymers will be obvious to the skilled worker and can be tried out quickly by simple experiment. The polymers should always contain the said repeating units, preferably to the extent of 20% by weight of the polymers. Very suitable polymers contain groups which are capable of forming secondary valence bonds and contain crystalline fractions. The preferred polymers have a molecular weight of more than 1000.

Examples of very suitable polymers are polyurethanes whose formula corresponds to the general formula:

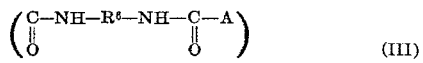
(III)

where A stands for the radical in square brackets in Formula II in which $n$ and $m$, in addition to being an integer between 1 and 10, may be 0, and $R^6$ denotes a divalent radical, for example an aliphatic radical having 4 to 22 carbon atoms, such as hexamethylene, decamethylene and nonadecamethylene; a cycloaliphatic radical, such as cyclohexylene and cyclohexylene/alkylene/cyclohexylene; a mononuclear or polynuclear aromatic radical, such as phenylene, toluylene, naphthylene and phenylene/alkylene/phenylene; and an araliphatic radical, such as phenylene/butylene and phenylene/oxyalkylene. They are prepared from the said diols, particularly hexadiyne-(2,4)-diol-(1,6) and/or octadiyne-(3,5) - diol - (2,7) and/or 3,6,13,16 - tetraoxaoctadecadiyne-(8,10)-diol-(1,18) and cycloaliphatic, aromatic, araliphatic and/or in particular aliphatic diisocyanates having 4 to 22 carbon atoms, it being preferred to use hexamethylene diisocyanate, bis(4-isocyanatophenyl)methane, toluylene-(1,5)-diisocyanate or naphthylene-(1,5)-diisocyanate. The said polyurethanes can be prepared with the addition of other diols, e.g. hexandiol, glycol, propanediol, in amounts up to 50 mole percent of the total weight of the diols; polyamide urethanes and/or polyamides may be prepared in a similar manner with the addition of diamines and/or dicarboxylic acids. The resulting polymers should if possible be viscous or solid at room temperature and always be substantially soluble in solvents. With regard to the production of the various polymers reference is made to the relevant chapter in Houben-Weyl, "Methoden der organischen Chemie," 4th Edition, vol. 14/2, Stuttgart, 1963.

As already mentioned, it is advantageous to process the polymers in the form of their solutions in polar solvents. The production of for example films or coatings can be carried out in a conventional manner, foils, papers, glass, metal or plastics sheets, textiles, leather or similar materials being used as substrates. Conventional binders, photosensitizers and/or inhibitors may also be added to the polymers.

During the preparation of a layer to be used for example for the production of images as well as during storage and exposure of the said layer it is advantageous and in many cases necessary not to heat the polymers used according to the invention to temperatures above their melting or softening point. However, heating the polymers to temperatures below their melting or softening point is advantageous during exposure and often results in a shortening of the exposure time.

Exposure of the polymers which turn into difficultly soluble colored systems can be effected with conventional light sources emitting high-energy rays; ultraviolet light is preferred, but ionizing radiation, X-rays or accelerated electron may also be used. The lamps used for exposure, for example through negative transparencies, are preferably those which emit mixed ultraviolet rays, such as high-pressure, medium-pressure or low-pressure mercury vapor lamps and superactinic fluorescent tubes. Exposure may also be carried out with light which corresponds to the bonds of the absorption spectrum of the diyne units, as well as in the presence of traces or small amounts such as are conventionally used of photosensitizers. There may be used conventional photosensitizers such as are described for example in chapter 5 of the said book by J. Kosar; the most suitable ones can be quickly determined by simple experiment. The same applies to the exposure time which depends, inter alia, on the type of pattern, the type of polymer, the desired depth of color, the temperature, the light source and the type of further additives.

After the image has been produced or the information fixed, the unexposed and consequently non-crosslinked polymers can be removed from the layer for example by washing with solvents for the polymer used.

The invention is further illustrated by the following examples in which parts are by weight unless stated otherwise. Parts by weight bear the same relation to parts by volume as the kilogram to the liter.

EXAMPLE 1

10 parts of hexamethylene diisocyanate and 10 parts of hexadiyne-(2,4)-diol-(1,6) which has been recrystallized a number of times from a mixture of dioxane and water are dissolved in 100 parts of dimethyl acetamide while excluding moisture. After the addition of 1 part of trimethylamine and 0.1 part of dibutyl tin dioctoate, the whole is heated for 5 hours at 50° C. The mixture is then poured into a mixture of methanol and water (volumetric ratio 1:3), the polymer separating out in the form of a white powder which is filtered, washed several times with water and dried. The yield is 90%.

A 10% solution of the resultant polymer is dimethyl acetamide is poured onto a sheet of glass and the solvent slowly evaporated in vacuo. There remains a clear film of the polymer which is exposed to the light from a high-pressure ultraviolet lamp through a pattern. The exposed areas turn deep red and, at the same time, become insoluble. The unexposed areas remain unchanged and the polymer there can be dissolved out with dimethyl acetamide. There remains only at the exposed areas a red, transparent and insoluble film.

EXAMPLE 2

2.5 moles of 3,6,13,16-tetraoxaoctadecadiyne-(8,10)-diol-(1,18) and 2.5 moles of hexamethylene diisocyanate are mixed in 5 l. of absolute tetrahydrofuran, and then 50 ml. of triethylamine and 5 g. of dibutyl tin dioctoate are added to the mixture. The whole is stirred for about 3 hours at 50° C. and then introduced into 10 l. of ligroin. The polyurethane separates out in the form of a viscous, yellow oil which is redissolved in tetrahydrofuran and reprecipitated from ligroin.

A 20% solution of the resultant polymer in tetrahydrofuran is poured onto a sheet of glass to give a thin, tacky film. This film is exposed to the light from powerful ultraviolet lamp through a mask for several minutes. The exposed areas harden rapidly and turn a reddish shade without losing their transparency. The polymer at the unexposed areas can be dissolved out by washing with tetrahydrofuran, whereas the exposed polymer is insoluble and firmly adheres to the substrate.

EXAMPLE 3

A polyurethane in the form of colorless flakes is prepared, as specified in Example 2, from 3,6,13,16-tetraoxaoctadecadiyne-(8,10)-diol-(1,18) and bis(4 - isocyanatophenyl)methane.

A 20% solution of the polymer in tetrahydrofuran is poured onto a sheet of glass to give a thin film. This film is covered with a pattern and exposed to the light from an ultraviolet lamp. The exposed areas turn yellowish red and become hard without losing their transparency. These areas remain firmly adhering to the substrate after the polymer at the unexposed areas has been dissolved out with tetrahydrofuran or dimethyl acetamide.

EXAMPLE 4

Following the procedure of Example 1, a polymer which is soluble in dimethyl formamide is prepared from hexadiyne-(2,4)-diol-(1,6) and 1,5-naphthylene diisocyanate. A 10% to two sheets of glass or aluminum to give $15\mu$ films. After the solvent has been evaporated, the films are exposed to ultraviolet light through a negative for 5 and 20 minutes respectively. Positives are obtained whose exposed areas are reddish brownish violet in color. Images of approximately the same quality are obtained at the said exposure times of 5 and 20 minutes.

EXAMPLE 5

25 parts of bis(4-isocyanatophenyl)methane is reacted with 12 parts of hexadiyne-(2,4)-diol-(1,6) in 110 parts by volume of tetrahydrofuran with the addition of 1 part by volume of triethylamine, and 0.5 part of dibutyl tin dioctoate for 3 hours at 50° C. The tetrahydrofuran solution is dripped into ligroin, a white polymer separating out. A 10% solution of the polymer in dimethyl formamide containing 5% by weight of benzoin isopropyl ether, with reference to the amount of polymer, is applied to aluminum foil to give a 15μ film which, after evaporation of the solvent, is exposed through a negative to the light from an ultraviolet lamp for 15 minutes. There is obtained a moderately contrasty, light brown positive which can be freed from non-crosslinked polymer by carefully wiping it with a mixture of ethanol and tetrahydrofuran in a ratio of 5:1.

EXAMPLE 6

2 moles of freshly distilled adipyl chloride and 2 moles of hexadiyne-(2,4)-diol-(1,6) are dissolved in 1.5 l. of absolute tetrahydrofuran. The mixture is cooled in an ice bath and 400 ml. of pyridine is dripped in with stirring. The whole is then heated to 50° C. and stirred for one hour at this temperature followed by filtering through a fritted glass disk. The filtrate is dripped into 5 l. of n-hexane, the polyester separating out in the form of a brown oil which solidifies after some time. The polymer is filtered off, dissolved in 2 l. of tetrahydrofuran and reprecipitated by dripping into 10 l. of ligroin (B.P. 40° to 60° C.). The polymer is now obtained in the form of a yellowish powder.

A 20% solution of the resultant polymer in tetrahydrofuran is poured onto a sheet of glass to give a thin, tacky film. This film is exposed to the light from a powerful ultraviolet lamp through a mask for 5 minutes. The exposed areas harden and turn orange without losing their transparency. The polymer at the unexposed areas is dissolved out by washing with tetrahydrofuran, whereas the exposed polymer is insoluble and firmly adheres to the substrate. When the film is irradiated at 110° C., the exposed areas turn yellowish red.

We claim:

1. A polar solvent-soluble polymer having recurring polar —NH— groups and a molecular weight of at least 1000, said polymer containing in the main chain of the polymer a plurality of the mer units

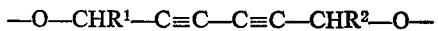

wherein $R^1$ and $R^2$ are selected from the group consisting of hydrogen and an organic radical having 1–14 carbon atoms.

2. A polymer as claimed in claim 1, said polymer being a polyurethane having mer units of the formula

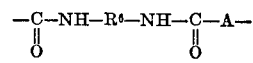

wherein A is a divalent group of the formula

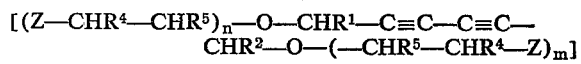

wherein both of $R^4$ and $R^5$ denote hydrogen or either of $R^4$ and $R^5$ denotes —$CH_3$ and the other denotes hydrogen, Z denotes —O— or —NH—, $R^1$ and $R^2$ have the aforesaid meanings, $n$ and $m$ represent an integer of 0 to 10, and $R^6$ denotes a divalent aliphatic group having 4–22 carbon atoms, a divalent cycloaliphatic group, a divalent aromatic group or a divalent araliphatic group.

3. A soluble polyurethane as claimed in claim 2 wherein $R^6$ denotes an alkylene group having 4–22 carbon atoms, a divalent bis-(phenyl)methane group, toluylene, or naphthylene.

References Cited

Sladkov et al.: Chem. Abstracts, 61, 1964, p. 14163.
Sladkov et al.: Chem. Abstracts, 61, 1964, p. 16168.
Wegner: Zeitschrift f. Naturforsch., 24(7), 1969, pp. 824–32.
Wegner: Chem. Abstracts, 71, 1969, p. 81783.

DONALD E. CZAJA, Primary Examiner

M. J. WELSH, Assistant Examiner

U.S. Cl. X.R.

117—124 E, 132 B, 132 C, 142, 155 R, 161 KP; 204—159.14, 159.19; 260—29.2 TN, 75 R